July 17, 1962 B. HOUSMAN ET AL 3,045,217

SIGNAL STORAGE SYSTEM

Filed Sept. 26, 1956 3 Sheets-Sheet 1

INVENTORS
BENNETT HOUSMAN
RICHARD C. JEFFREY
ROLLIN P. MAYER
DONALD B. THOMPSON

BY Theodore C. Wood

AGENT

OD STATUS CONTROL CIRCUIT

United States Patent Office 3,045,217

Patented July 17, 1962

3,045,217
SIGNAL STORAGE SYSTEM

Bennett Housman, Poughkeepsie, N.Y., Richard C. Jeffrey, Princeton, N.J., Rollin P. Mayer, Concord, Mass., and Donald B. Thompson, Poughkeepsie, N.Y., assignors, by direct and mesne assignments, to Research Corporation, New York, N.Y., a corporation of New York Filed Sept. 26, 1956, Ser. No. 612,268
4 Claims. (Cl. 340—174.1)

This invention relates to signal storage systems and more particularly to digital data signal storage systems.

In copending application Serial Number 494,982 entitled "Magnetic Data Storage" filed by Robert R. Everett et al. on March 17, 1955, now Patent No. 2,988,735, a cyclic type of storage system is presented which permits writing and reading operations to take place at random in the various storage registers. With such a cyclic type of storage system, the access time for reading and writing operations is a function of the "empty" or "full" status of the registers.

It is convenient, at times, in the art of digital data systems to refer to the signal representative of the smallest element of intelligence as a bit, several bits as a word and several words as a message.

When the bits of a word are handled by a system simultaneously, the system is said to operate in the parallel mode. The system illustrated in the above referred to copending application can be said to operate in parallel by word but serial by message since each of the storage registers of the system includes stages equal in number to the number of bits in a word. When such a storage system is used to store the words of each of several messages, it is sometimes important that provision be made such that the words of a given message and the order of those words can be determined by the device which receives signals from the storage system. This provision is sometimes required since in a system such as that presented in the above referred to copending application, words are stored randomly in the registers, that is, successive words of a message may not necessarily be stored in successive registers.

A provision is presented in copending application Serial Number 580,430, now Patent No. 3,014,654, entitled "Random Storage Input Device" filed by R. E. Wilser et al. on April 20, 1956 whereby the order of the words of a message, delivered from storage to a signal receiver, may be determined. In that system a tag of coded signals accompanies the words and the coded signals identify the order of the words. With such an arrangement, each register must provide for storage of the coded signals in addition to storage of the actual word of information.

Another provision is presented in U.S. Patent No. 2,932,010 issued to R. P. Mayer et al. on April 5, 1960, whereby the order of words of a message, delivered from storage to a signal receiver, may be determined. In that system although various messages are stored at random, the successive words of a message are stored in successive registers by the use of a counter which effectively divides the registers into groups or slots and the words of a message are stored in the successive registers. Such an arrangement using a counter to divide the registers in groups is very effective and quite practical when there is a small number of words in a message and where the number of words of a message is fixed.

This invention provides a storage system of the type having information signals stored at random in the various storage registers wherein those registers are logically grouped in any desired pattern. The system according to this invention is relatively easy to manufacture, install, operate, maintain and the logical grouping of registers is easily altered.

Briefly stated, in accordance with the principles of this invention, the storage system includes a record which establishes a pattern that divides the registers in groups, each group having a predetermined number of registers. The pattern can be changed by merely changing the record.

An object of this invention is to provide an improved signal storage system wherein signals may be randomly stored in any of several groups of storage registers, the number of registers of a group being determined by a record.

Another object of this invention is to provide an improved signal storage system of the magnetic drum type wherein access for reading and writing operations is by empty and full status of groups of storage registers and the number of registers in a group is determined by a magnetic record on the drum.

Still another object of this invention is to provide an improved signal storage system of the magnetic drum type wherein signals are recorded on the drum indicating the full and empty status of each of several groups of registers and signals, when available, are stored in the first empty group of registers available to be written into.

A further object of this invention is to provide an improved signal storage system of the magnetic drum type wherein storage registers are circumferentially displaced around the surface of the drum, signals are recorded on the drum indicating the first register of each of a plurality of groups of registers, and these signals control the writing operations of the drum.

A still further object of this invention is to provide an improved signal storage system wherein a magnetic drum has its writing circuits controlled by a record on the drum such that writing operations of the drum may take place at random; however, when writing operations begin, each of several consecutive drum registers are written into under the control of the record.

Other objects of the invention will be pointed out in the following description and claims and illustrated in the accompanying drawings, which disclose, by way of example, the principles of the invention and the best mode, which has been contemplated, of applying those principles.

Figure 1:
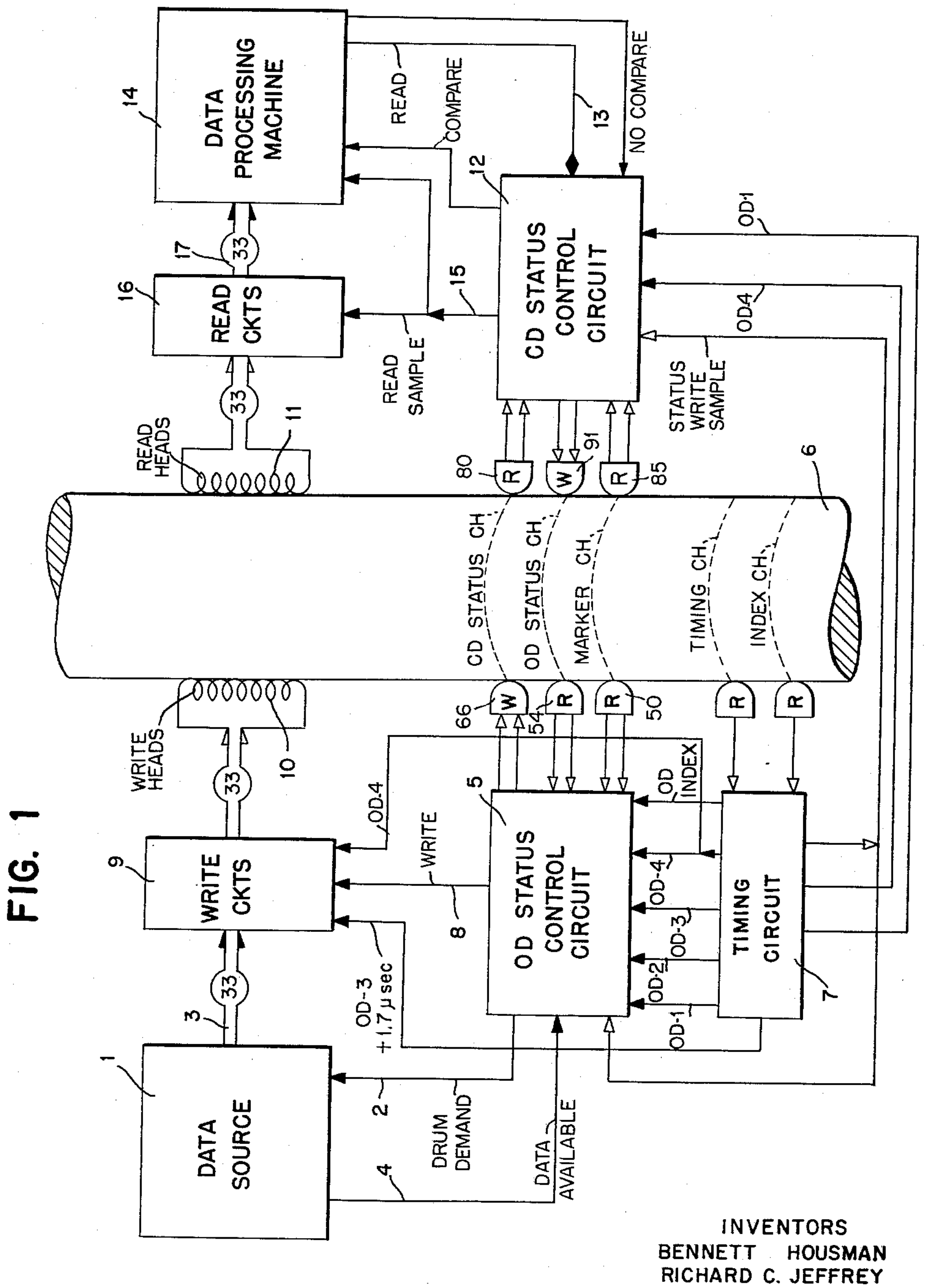
FIG. 1 is a diagram of the functional block type illustrating a storage system constructed in accordance with the principles of this invention.

The symbols employed in the figures of the drawing and the conventions employed in the subsequent description are described in the above referred to copending application Serial Number 494,982, now Patent No. 2,988,735, filed by R. R. Everett et al.

Reference is now made to FIG. 1 which is a diagram in functional block form of a data storage system constructed in accordance with the principles of this invention. A data source 1 is so constructed that in response to a pulse on a conductor 2 labeled Drum Demand it will produce a pluse, no pulse, combination representative of a word of data on the conductors of cable 3. The data source 1 not only delivers a first word as above described but at 10 microsecond intervals delivers successive words equal in number to the number of words in a message. For the purposes of illustration it will be assumed that the data source 1 delivers three successive words in reponse to each pulse that it receives on the conductor 2 labeled Drum Demand. These successive words are spaced in time at an interval of 10 microseconds and each time a word is delivered to the conductors of cable 3 the data source 1 delivers a pulse to a conductor 4 labeled Data Available.

Pulses on conductor 2 are produced by an OD Status Control Circuit 5 which receives signals recorded in an OD Status Channel and a Marker channel of a drum 6. The drum 6 further includes a timing channel, an index channel and a CD Status Channel. The drum 6 may be of any suitable construction; however in a preferred embodiment of this invention the drum 6 has a construction such as that described in the previously mentioned copending application Serial Number 494,982. The drum preferably includes a closed timing channel, that is, the timing channel has recorded therein, in any suitable manner, a succession of equidistantly spaced timing signals around the entire periphery of the drum. In the preferred embodiment the timing channel has 2,048 equidistantly spaced timing signals to thereby logically divide the periphery of the drum into 2,048 equidistantly spaced storage registers. The index channel of the drum 6 has recorded therein a signal to indicate that this particular point on the periphery of the drum is to be considered as an index point. The Marker channel of the drum has recorded therein any suitable manner signals which effectively divide the various registers of the drum into groups or slots. In the illustrated preferred embodiment it is assumed that the drum is divided into groups of registers such that each group includes three registers. For this reason the marker channel has recorded therein binary ONE signals with two binary ZERO signals placed between binary ONE signals. In this way a binary ONE signal may be said to indicate the first register of a three register slot. The OD Status Channel and the CD Status Channel have recorded therein signals which indicate the status of each register, that is, if a given drum register is full a binary ONE is recorded in the status channels indicating this fact whereas if a given drum register is empty a binary ZERO is recorded in those status channels indicating that fact. Signals read from the timing channel and the index channel are delivered to a timing circuit 7. The timing circuit in response to signals from the timing channel and the index channel delivers the following pulses:

(1) In response to each timing channel signal the timing circuit 7 delivers a pulse to the conductor labeled OD–1 followed at 2½ microseconds by a pulse on the conductor labeled OD–2, followed at 2½ microseconds by a pulse on the conductors labeled OD–3, followed at 2½ microseconds by a pulse on a conductor labeled OD–4.

(2) The timing circuit 7 delivers a pulse on conductor labeled OD–3+1.7 microseconds, 1.7 microseconds after each pulse which the timing circuit delivers to the conductor labeled OD–3.

(3) In response to each signal read by one of the read heads of the index channel indicating the index point of the drum, a pulse is delivered by the timing circuit 7 to the conductor labeled OD Index and in response to each signal read by the other read head of the index channel indicating the index point of the drum, a pulse is delivered by the timing circuit 7 to the conductor labeled OD Index.

(4) Each time that a pulse is delivered by the timing circuit 7 to the conductor labeled OD–3 it also delivers a pulse to the conductor labeled Status Write Sample which begins at substantially the time of the OD–3 pulse and has a duration of approximately 1.7 $\mu$sec.

The OD–1 through OD–4 pulses as well as the OD Index pulses, the Marker channel signals and OD status channel signals are delivered to the OD Status Control Circuit 5. The OD Status Control Circuit 5 functions as follows:

(1) In response to a binary ONE signal received from the Marker channel coincident in time with a binary ZERO signal received from the OD Status channel, the OD Status Control Circuit 5 delivers a pulse at OD–3 time to the conductor 2 labeled Drum Demand. Since a binary ONE in the Marker channel indicates the first register of a three register slot and since a binary ZERO in the OD Status Channel indicates that the register is empty, a pulse delivered to conductor 2 effectively means that the next three successive registers available for a writing operation on the drum are empty.

(2) If a pulse is not received on conductor 4 by the OD Status Control Circuit between OD–4 time and the next following OD–1 time, the OD Status Control Circuit delivers a Write a ZERO signal to the write head positioned adjacent to the CD Status channel and this ZERO signal is representative of the fact that this drum register is empty.

(3) If a pulse is received on conductor 4 between OD–4 time and the next OD–1 time the OD Status Control Circuit 5 delivers a pulse to a conductor 8 labeled Write and also delivers a Write a ONE signal to the write head positioned adjacent to the CD Status Channel thereby recording a signal indicating that the drum register is full. A pulse on conductor 8 in combination with a pulse on the conductor labeled OD–3+1.7 microseconds causes write circuits 9 to deliver signals to the write heads 10 which correspond to the signals received from the data source 1 by way of the conductors of cable 3. The write circuits 9 also receive OD–4 pulses which cause those write circuits to be reset to ZERO at each OD–4 time. For this reason the data source 1 is so constructed that if data is available to be written on the drum and a drum demand pulse on conductor 2 which occurs at OD–3 time is received, the data source delivers the pulses to the conductors of cable 3 representative of the word of data to be written on the drum and these pulses occur subsequent to OD–4 time but prior to the following OD–1 time.

Briefly reviewing the above description when the marker channel signal indicates the first register of a three register slot and this signal is coincident with a binary ZERO signal recorded in the OD Status Channel indicating that the register is empty, the OD Status Control Circuit 5 delivers a pulse to the conductor 2 labeled Drum Demand. If the data source 1 has signals available for recording on the drum, the signals representative of the first word of the three word message are delivered to the conductors of cable 3 and a pulse is delivered to the conductor 4 labeled Data Available. These signals on the conductors of cable 3 are delivered to the Write circuits 9 where they are stored and condition the Write circuits according to the signals received. The OD Status Control Circuit 5 upon receipt of the pulse on conductor 4 causes the Write circuits 9 to be sampled by a pulse on conductor 8 and furthermore delivers a Write a ONE signal for recording in the CD Status channel. The first word of the three word message is thereby written in the first register of the three register slot on the drum and the CD Status Channel indicates that this register is now full. The data source 1 then delivers the second word of data to the conductors of cable 3 and delivers another pulse to conductor 4. This second word of data is written into the second register of the three register slot in a manner identical to writing the first word. The data source 1 then delivers the third word of data to the conductors of cable 3 and delivers a third pulse to the conductor 4 and this third word is then written into the third register of the three register slot. If the OD Status Control Circuit 5 delivers a pulse to conductor 2 as above described and the data source 1 does not have any data to be written on the drum, no pulse will be delivered to the conductor 4 and the absence of a pulse on this conductor causes the OD Status Control Circuit 5 to deliver ZERO signals to the CD Status Channel indicating that those registers are still empty.

The operation of the drum system as thus far described has been with relation to that part of the drum system known as the OD side of the drum, that is, that part of the drum system concerned with outside equipment and drum interchange. The remainder of the drum system is known as the CD side since it is concerned with computer and drum interchange. The CD side of the drum system includes a set of read heads 11 so positioned on the drum as to receive the signals recorded on the drum surface by the write heads 10. The CD side of the drum system further includes a CD Status Control Circuit 12 which receives signals recorded in the CD Status Channel and delivers signals to be recorded in the OD Status Channel. The CD Status Control Circuit 12 further receives a control signal on a conductor 13 labeled Read from a data processing machine 14. The CD Status Control Circuit 12 further receives OD–1 and OD–4 timing pulses as well as Status Write sample pulses and CD Index pulses on conductors correspondingly labeled from the timing circuits 7. The CD Status Control Circuit 12 functions as follows:

(1) If instructed to read by receiving a positive 10 volt signal on the conductor 13 this circuit delivers a pulse to a conductor 15 labeled Read Sample each time that it receives a signal from the CD Status Channel indicating that the drum register is full. The pulses delivered to the conductor 15 are sent to read circuits 16 where they cause sampling of those read circuits and therefore deliver the signals read from the drum by read heads 11 to the data processing machine 14. These pulses on conductor 15 are also delivered to the data processing machine 14 directly where they actuate suitable control circuits to indicate that pulses have been delivered from the read circuits by way of the conductors of cable 17 to the data processing machine.

(2) If instructed to read (a positive potential is received on conductor 13) when a signal is read from the Marker Channel which indicates that the next register to come under the read heads 11 is the first register of a three register slot and the signal read from the CD Status Channel indicates that that register is full, the CD Status Control Circuit 12 delivers a pulse to the conductor labeled "Compare."

(3) If instructed to read (a positive potential is received on conductor 13) a signal is recorded in the OD Status Channel indicating that the register of the drum corresponding to that signal is full provided that a pulse is received on the conductor labeled "No Compare" and a signal is recorded in the OD Status Channel indicating that the register of the drum corresponding to that signal is empty provided that no pulse is received on the conductor labeled "No Compare."

(4) When the Status Control Circuit 12 is not instructed to read, that is, a negative 30 volts is received on conductor 13, this circuit merely causes the status signals read from the CD Status Channel to be written into the OD Status Channel. In this way any register which is indicated by the CD Status Channel as being full will be indicated in the OD Status Channel as being full and any register indicated by the CD Status Channel as being empty will be so indentified in the OD Status Channel.

Figure 2:
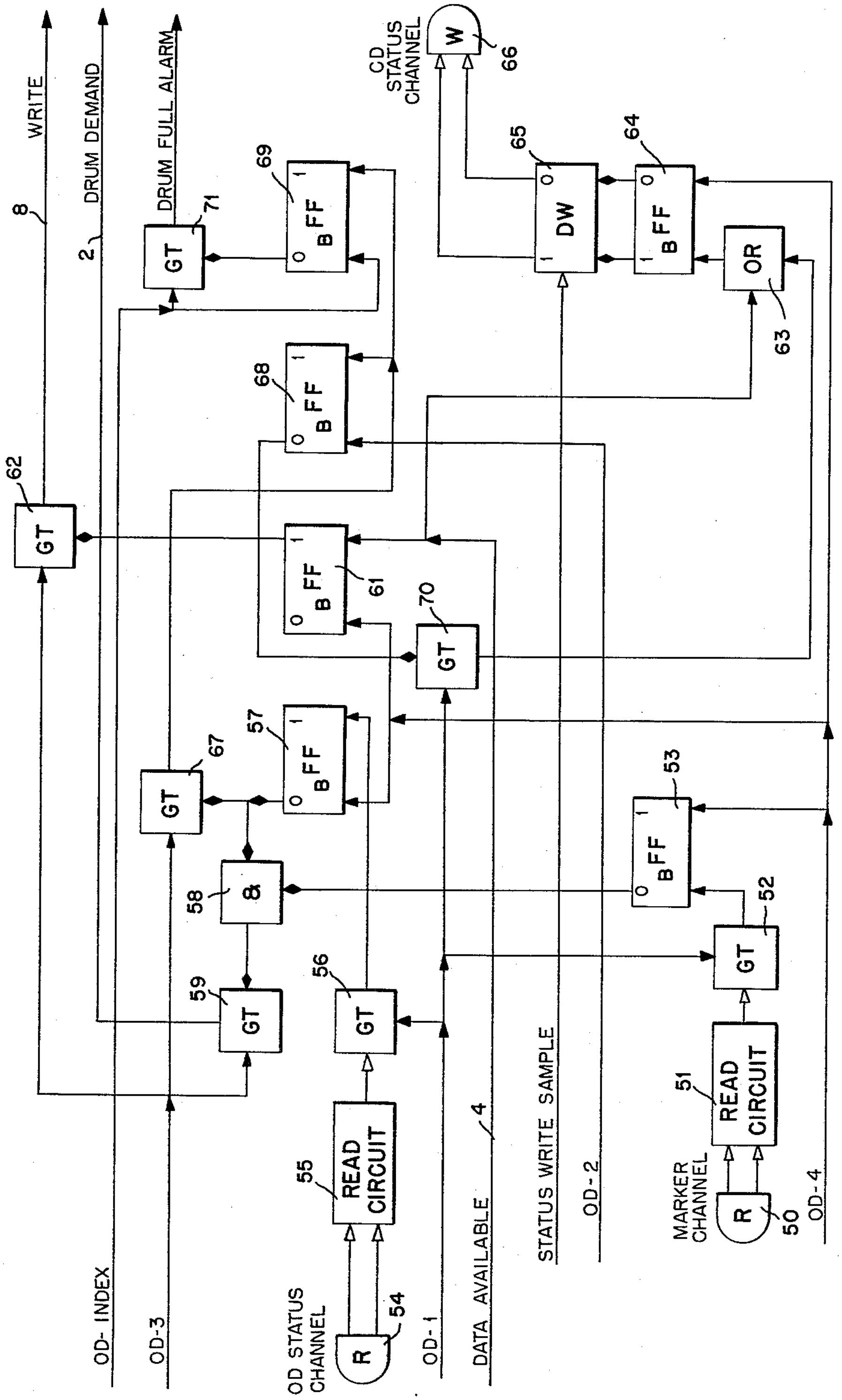
FIG. 2 is a logical block diagram of the OD Status Control Circuit shown as block 5 in FIG. 1.

Reference is now made to FIG. 2 which is a schematic diagram in logical block form of the OD Status Control Circuit shown as block 5 in FIG. 1. A read head 50 delivers signals to a read circuit 51 indicating whether or not the next register available to be written into is designated as the first register of a three register slot or compartment. As previously indicated, the signals recorded in the Marker Channel of the drum, to which the read head 50 responds, are a binary ONE followed by two successive binary ZEROS, followed by another binary ONE and so forth.

When a binary ONE signal is delivered by the read head 50 to the read circuit 51, that circuit conditions a gate 52 to pass the next received OD–1 pulse. An OD–1 pulse passed by gate 52 causes a flip-flop 53 to be set in its binary ZERO state. In this way flip-flop 53 will be in its binary ZERO state at OD–3 time every third drum register and when in the binary ZERO state at OD–3 time it indicates that this register is the first of a three register slot.

A read head 54 delivers signals read from the OD Status Channel to a read circuit 55. When the read head 54 reads a binary ONE in the OD Status Channel (indicating that the next drum register available to be written into is full), read circuit 55 causes a gate 56 to be conditioned to pass an OD–1 pulse. This OD–1 pulse passed by gate 56 sets a flip-flop 57 in its binary ONE state. Flip-flop 57 will therefore be in its ZERO state at OD–3 time only when a drum register available to be written into its empty.

Since flip-flop 53 and flip-flop 57 have their ZERO outputs applied to an AND circuit 58, that AND circuit will cause a gate 59 to be conditioned at OD–3 time under the conditions that the register available to be written into is the first register of a three register slot and that register is empty. A pulse passed by gate 59 is delivered to the previously referred to conductor 2 labeled Drum Demand.

In the event that data is available to be written onto the drum a pulse is produced on the conductor 4 labeled Data Available in the manner previously described with reference to FIG. 1. A pulse on conductor 4 causes a flip-flop 61 to be set in its ONE state. When flip-flop 61 is in the ONE state, a gate circuit 62 is conditioned to pass the next received OD–3 pulse to the previously mentioned conductor 8 labeled Write. In this way a pulse is delivered to the conductor 8 labeled Write at OD–3 time in response to each data available pulse received by the OD Status Control Circuit.

When a pulse is received on the conductor 4 labeled Data Available, it is also delivered through another OR circuit 63 to cause a flip-flop 64 to be set in its binary ONE state. Flip-flop 64 has its ONE and ZERO outputs applied to a drum writer 65 such that when the flip-flop is in its ONE state it conditions the drum writer to deliver a Write a One signal to a write head 66 in response to a pulse on the conductor labeled Status Write Sample. When in the ZERO state, flip-flop 64 conditions the drum writer to deliver a Write a Zero pulse to the Write head 66 in response to a pulse on the conductor labeled Status Write Sample. The pulse on the conductor labeled Status Write Sample is approximately 1.7 microseconds in duration so that the width of the pulse delivered to the write head 66 will properly energize that head to write binary signals on the drum. In this manner each time a pulse is received on the conductor labeled Data Available a pulse is delivered to the conductor 8 labeled Write and a binary ONE signal is delivered to the write head 66 to thereby cause the CD Status Channel to record the fact that the drum register is full.

If a binary ONE is read in the OD Status Channel by read head 54, flip-flop 57 is set in its ONE state in the manner previously described. When in the binary ZERO state flip-flop 57 conditions a gate 67 such that it passes an OD–3 pulse to set a flip-flop 68 in its ONE state and another flip-flop 69 in its ONE state. The ZERO output of flip-flop 68 conditions a gate 70 which is sampled by OD–1 pulses. Since flip-flop 68 is set in its ZERO state by OD–2 pulses it will be seen that it will remain in its ZERO state during the following OD–1 time only when a binary ONE is read in the OD Status Channel. Under this condition gate 70 passes the OD–1 pulse through OR circuit 63 to set flip-flop 64 in its ONE state. A binary ONE read in the OD Status Channel indicating that the register is full is accordingly written in the CD Status Channel. If a ZERO is read in the OD Status Channel by the read head 54 and no data is available to be written into that register a ZERO will be written in the CD Status Channel since flip-flop 64 is set in its ZERO state at OD–4 time and will remain in that state at the following OD–3 time if no pulse is received on the conductor 4 labeled Data Available. Flip-flop 69 has its ZERO output applied to the conditioning input of a gate 71 and since this flip-flop is set in its ZERO state by the OD index pulses and set in its ONE state only if there is an empty register on the drum, gate 71 will pass a pulse only if a complete revolution of the drum has been made and no empty register has been indicated. The output of gate 71 may be used to actuate any suitable alarm to indicate that the drum has all registers full.

Figure 3:
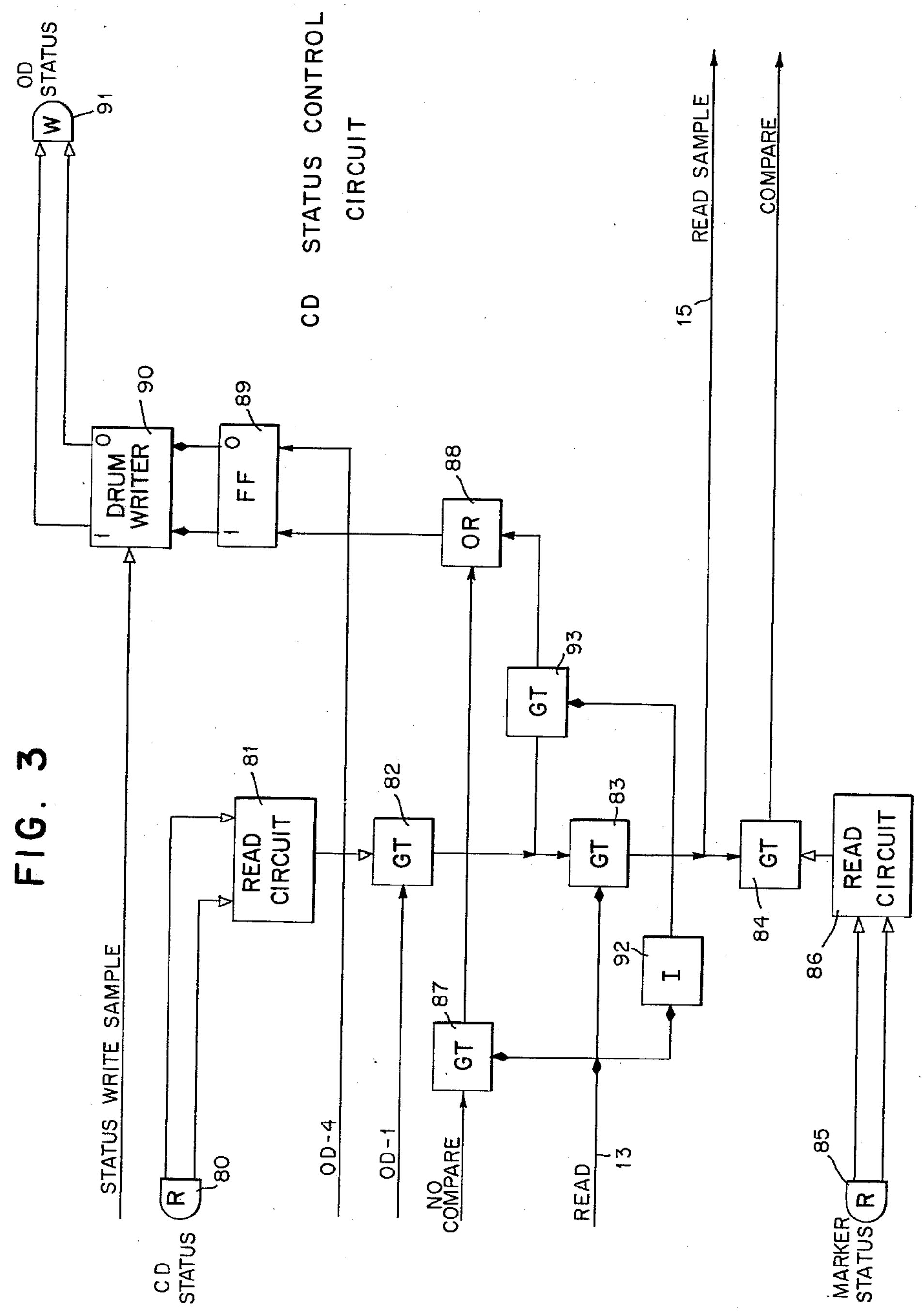
FIG. 3 is a schematic diagram in logical block form of the CD Status Control Circuit shown as block 12 in FIG. 1.

Reference is now made to FIG. 3 which is a schematic diagram in logical block form of the OD Status Control Circuit shown as block 12 in FIG. 1. A read head 80 delivers signals to a read circuit 81 indicating whether or not the next register, available to be read from, is empty or full. When the read head 80 reads a binary ONE in the CD Status Channel (indicating that the next drum register available to be read from is full), read circuit 81 causes a gate 82 to be conditioned to pass an OD–1 pulse. A pulse passed by gate 82 samples a gate 83 which is conditioned when the CD Status Control Circuit is instructed to read (a positive D.C. level is received on conductor 13). A pulse passed by gate 83 is delivered to the conductor 15 labeled Read Sample and this pulse also samples a gate 84. Read head 85 delivers signals to a read circuit 86 indicating whether or not the next register available to be read from is designated as the first register of a three register slot. When a binary ONE signal (indicating the first register of a three register slot) is delivered, by the read head 85 to read circuit 86, the circuit conditions gate 84. A pulse from gate 83 is therefore passed by gate 84 to the conductor labeled compare when that full register is the first register of a three register slot.

When the CD Status Control Circuit is instructed to read (a positive D.C. level is received on conductor 13) a gate 87 is conditioned to pass a pulse received on the conductor labeled No Compare. A pulse passed by gate 87 is delivered through an OR circuit 88 to cause a flip-flop 89 to be set in its ONE state. Flip-flop 89 has its ONE and ZERO outputs applied to a drum writer 90 such that when the flip-flop is in its ONE state it conditions the drum writer to deliver a Write a ONE signal to a write head 91 in response to a pulse on the conductor labeled Status Write Sample. When in the ZERO state, flip-flop 89 conditions the drum writer to deliver a Write a ZERO pulse to the write head 91 in response to a pulse on the conductor labeled Status Write Sample. In this way, the CD Status Control Circuit causes a full signal to be recorded in the OD Status Control Channel if the word read from the register was not accepted by the Data Processing Machine.

When the CD Status Control Circuit is not instructed to read (a negative D.C. level is received on conductor 13), an inverter 92 causes a gate 93 to be conditioned. A pulse passed by gate 82 (indicating that the register corresponding to that signal is full) samples gate 93, which if conditioned passes the pulse through OR circuit 88 to cause flip-flop 89 to be in its ONE state. It should be noted that flip-flop 89 is cleared to its ZERO state by OD–4 pulses and therefore the drum writer 90 causes Write a ZERO signals to be delivered to the write head 91 except under the two conditions; (1) that the word read from the drum was not accepted by the Data Processing Machine, and (2) that the CD Status Control Circuit was instructed not to read and the status of the register, as indicated by the CD Status Channel signal, is full.

From the above description it will be apparent that any suitable equipment may be employed as a data source, and as a Data Processing Machine. However, a specific example of a circuit suitable for the data source is shown and described in detail in copending application Serial Number 582,578, entitled "Data Storage System," filed by J. S. Crosby et al. on May 3, 1956. A specific example of circuits suitable as a Data Processing Machine is shown and described in detail in copending application Serial Number 612,266, entitled "Control Equipment," filed by R. J. Cypser et al. on September 26, 1956.

The details of specific circuits which may be employed for the timing circuit 7 in FIG. 1, the write circuit 9, the OD Status Control Circuit 12, the Read Circuit 16, as well as the details of the basic circuits of FIG. 2, may be found in the above mentioned copending application Serial Number 494,982, now Patent No. 2,988,735, filed by Robert R. Everett et al. on March 17, 1955. It will thus be seen that in the apparatus constructed in accordance with the principles of this invention, the pattern controlling the number of registers in a slot of the drum may be changed readily and in the embodiment illustrated it is merely necessary to change the binary ONE and binary ZERO signals in the Marker Channel in order to change the number of registers in a drum slot.

While there have been shown and described and pointed out the fundamental novel features of the invention as applied to a preferred embodiment, it will be understood that various omissions and substitutions and changes in the form and details of the device illustrated and in its operation may be made by those skilled in the art without departing from the spirit of the invention. It is the intention therefore, to be limited only as indicated by the scope of the following claims.

What is claimed is:

1. A signal storage system for storing data words in the form of coded signal combinations,
   comprising a multiplicity of signal storage registers,
   each said signal storage register being adapted to store a data word of said coded signal combinations,
   said signal storage registers being arranged in successive relation for data translation,
   message translation control means including a message translation control element corresponding to each said signal storage register,
   each said message translation control element having a message translation control signal recorded therein,
   the message translation control signals in successive message translation control elements being arranged in a plurality of series of signals for controlling the translation of multi-word messages to the corresponding plurality of groups of said signal storage registers,
   each said series of message translation control signals including a first signal of one value followed by second signals of a different value so that each said series is effective to identify the corresponding group of signal storage registers,
   data storage status control means including a status control element corresponding to each said signal storage register,
   means to record in each data storage status control element a signal indicating the full or empty status with respect to data of the corresponding signal storage register,
   means to read the signals recorded in said message translation control elements and said data storage status control elements,
   and means for translating a multi-word message relative to a group of said signal storage registers in response to the sensing by said reading means of a said first signal in a message translation control element whereby the first signal storage register of the group is identified
   and a signal from the data storage status control element corresponding to the first register of that group of signal storage registers identified by said first signal,
   which status control signal indicates the availability of that group of signal storage registers for translation of the multi-word message.

2. The system as claimed in claim 1 and further including an associated data processing machine adapted to provide a data request signal.

and control means responsive to said reading means for controlling the translation of data from said signal storage registers, said control means providing in response to said data request signal from the associated data processing machine a message translation initiating signal upon the sensing by said reading means of a said first signal in a message translation control element indicating the first register of a group of registers, and the sensing by said reading means of a signal in the corresponding data storage status control element indicating that a data word is stored in the corresponding signal storage register for initiating the translation of the multi-word message from that group of signal storage registers to said data processing machine.

3. A magnetic drum system for storing data words in the form of coded signal combinations, comprising a magnetic drum, said drum having a multiplicity of axially extending signal storage registers, each said signal storage register being adapted to store a data word of said coded signal combinations, said signal storage registers being arranged around the periphery of said drum in successive relation for data translation, an index channel extending around the periphery of said drum including an element corresponding to each said signal storage register, said index channel having a signal of one value recorded in one element and signals of another value recorded in all the other elements, a timing channel extending around the periphery of said drum including an element corresponding to each said signal storage register, said timing channel having a signal of the same value recorded in each element, a marker channel extending around the periphery of said drum including a marker element corresponding to each said signal storage register, each said marker element having a message translation control signal recorded therein, the message translation control signals in successive marker elements being arranged in a plurality of series of signals for controlling the translation of multi-word messages to the corresponding plurality of groups of said signal storage registers, each said series of message translation control signals including a first signal of one value followed by second signals of a different value so that each said series is effective to identify the corresponding group of signal storage registers, two data storage status control channels extending around the periphery of said drum, each said data storage status control channel including a status control element corresponding to each said signal storage register, means to record in each data storage status control element of one data storage status control channel a signal indicating the availability of the corresponding signal storage register to receive a data word, means to record in each data storage status control element of the second data storage status control channel a signal indicating that a data word is stored in the corresponding signal storage register, means to read the signals recorded in said marker channel elements and said data storage status control channel elements, and means for translating a multi-word message relative to a group of said signal storage registers in response to the sensing by said reading means of a said first signal in a marker channel element whereby the first signal storage register of the group is identified and a signal from the data storage status control channel element corresponding to that first register of that group of signal storage registers indicating the availability of that group of signal storage registers for translation of the multi-word message.

4. The system as claimed in claim 3 and further including an associated data processing machine adapted to provide a data request signal, and control means providing in response to said data request signal from the associated data processing machine a message translation initiating signal upon the sensing by said reading means of a said first signal in a marker channel element indicating the first register of a group of registers, and the sensing by said reading means of a signal in the corresponding data storage status control element of said second data storage status control channel indicating that a data word is stored in the corresponding signal storage register, said message translation initiating signal initiating the translation of the multi-word message from that group of signal storage registers on said magnetic drum to said data processing machine.

References Cited in the file of this patent

UNITED STATES PATENTS

| | | |
|---|---|---|
| 2,611,813 | Sharpless | Sept. 23, 1952 |
| 2,771,595 | Hendrickson | Nov. 20, 1956 |
| 2,817,072 | Li Chien et al. | Dec. 17, 1957 |
| 2,907,005 | Li Chien et al. | Sept. 29, 1959 |
| 2,923,922 | Blickensderfer | Feb. 2, 1960 |